(12) United States Patent
Sukthankar et al.

(10) Patent No.: US 6,618,076 B1
(45) Date of Patent: Sep. 9, 2003

(54) METHOD AND APPARATUS FOR CALIBRATING PROJECTOR-CAMERA SYSTEM

(75) Inventors: Rahul Sukthankar, Somerville, MA (US); Robert Stockton, Pittsburgh, PA (US); Matthew Mullin, Pittsburgh, PA (US)

(73) Assignee: Justsystem Corporation, Tokushima (JP)

( * ) Notice: Subject to any disclaimer, the term of this patent is extended or adjusted under 35 U.S.C. 154(b) by 0 days.

(21) Appl. No.: 09/712,747

(22) Filed: Nov. 14, 2000

Related U.S. Application Data

(60) Provisional application No. 60/172,037, filed on Dec. 23, 1999.

(51) Int. Cl.⁷ .......................... H04N 9/28; H04N 17/02; H04N 17/00; G09G 1/28
(52) U.S. Cl. ................ 348/180; 348/191; 348/745; 348/746; 348/747; 348/175; 348/177; 345/156; 345/158; 353/122
(58) Field of Search ................................ 348/745, 746, 348/747, 180–1, 187, 189, 191, 806, 807, 658, 175–178, 744; 315/368.11, 368.13, 368.22; 353/122; 345/156, 158

(56) References Cited

U.S. PATENT DOCUMENTS

| | | | |
|---|---|---|---|
| 4,111,536 A | 9/1978 | Taylor | 352/132 |
| 4,185,918 A | 1/1980 | DiMatteo et al. | 356/375 |
| 4,372,655 A | 2/1983 | Matsumura et al. | 351/206 |
| 4,621,292 A | 11/1986 | Hirao et al. | 358/227 |
| 4,682,214 A | 7/1987 | Sato et al. | 358/55 |
| 4,754,329 A | 6/1988 | Lindsay et al. | 358/139 |
| 4,843,410 A | 6/1989 | Kallenberg | 354/77 |
| 4,988,187 A | 1/1991 | Kuriyama | 353/101 |
| 4,988,856 A | 1/1991 | Hamada et al. | 250/201.8 |

(List continued on next page.)

OTHER PUBLICATIONS

Faugeras, Olivier, "Three–Dimensional Computer Vision", The MIT Press, 14 pages, 1992.

Longuet–Higgins, H.C., "A Computer Algorithm for Reconstructing A Scene From Two Projections", Nature, vol. 293, pp. 133–135, 1981.

Faugeras, O.D. et al., "Motion and Structure from Motion in a Piecewise Planar Environment", National Journal of Pattern Recognition and Artificial Intelligence, vol. 2, pp. 485–508, 1988.

Tagare, Hemant D., et al., "Simultaneous Estimation of Shape and Reflectance Map from Photometric Stereo", GIP: Image Understanding, vol. 55, pp. 275–286, 1992.

Hartley, Richard I., "In Defense of the Eight–Point Algorithm," IEEE Transactions on Pattern Analysis and Machine Intelligence, vol. 19, pp. 580–593, 1997.

Lohmann, Adolf W., et al., "Digital Method for Measuring the Focus Error", Applied Optics, vol. 36, pp. 7204–7209, 1997.

*Primary Examiner*—John Miller
*Assistant Examiner*—Paulos Natnael
(74) *Attorney, Agent, or Firm*—Webb Ziesenheim Logsdon Orkin & Hanson, P.C.

(57) ABSTRACT

The present invention enables a user to automatically calibrate a projector-camera system to recover the mapping from a given point in the source (pre-projection) image and its corresponding point in the camera image, and vice versa. One or more calibration patterns are projected onto a flat surface with possibly unknown location and orientation by a projector with possibly unknown location, orientation and focal length. Images of these patterns are captured by a camera mounted at a possibly unknown location, orientation and with possibly unknown focal length. Parameters for mapping between the source image and the camera image are computed. The present invention can become an essential component of a projector-camera system, such as automatic keystone correction and vision-based control of computer systems.

46 Claims, 1 Drawing Sheet

U.S. PATENT DOCUMENTS

| | | | |
|---|---|---|---|
| 5,159,378 A | 10/1992 | Takada et al. | 354/403 |
| 5,216,504 A | 6/1993 | Webb et al. | 358/139 |
| 5,231,481 A | 7/1993 | Eouzan et al. | 358/60 |
| 5,255,045 A | 10/1993 | Nonaka | 354/403 |
| 5,274,362 A | 12/1993 | Potvin | 345/178 |
| 5,276,523 A | 1/1994 | Kurematsu et al. | 358/236 |
| 5,278,602 A | 1/1994 | Honna et al. | 354/406 |
| 5,298,993 A | 3/1994 | Edgar et al. | 348/180 |
| 5,321,494 A | 6/1994 | Donahue et al. | 356/218 |
| 5,329,310 A | 7/1994 | Liljegren et al. | 348/147 |
| 5,339,154 A | 8/1994 | Gassler et al. | 356/376 |
| 5,363,318 A | 11/1994 | McCauley | 364/571.01 |
| 5,369,432 A | 11/1994 | Kennedy | 348/181 |
| 5,371,537 A | 12/1994 | Bohan et al. | 348/181 |
| 5,373,343 A | 12/1994 | Nonaka | 354/403 |
| 5,381,349 A | 1/1995 | Winter et al. | 364/526 |
| 5,475,447 A | 12/1995 | Funado | 348/745 |
| 5,483,259 A | 1/1996 | Sachs | 345/153 |
| 5,499,040 A | 3/1996 | McLaughlin et al. | 345/146 |
| 5,502,458 A | 3/1996 | Braudaway et al. | 345/153 |
| 5,561,459 A | 10/1996 | Stokes et al. | 348/180 |
| 5,570,108 A | 10/1996 | McLaughlin et al. | 345/146 |
| 5,614,925 A | 3/1997 | Braudaway et al. | 345/153 |
| 5,619,349 A | 4/1997 | Ueda et al. | 358/521 |
| 5,638,117 A | 6/1997 | Engeldrum et al. | 348/179 |
| 5,734,938 A | 3/1998 | Hamada et al. | 396/95 |
| 5,739,809 A | 4/1998 | McLaughlin et al. | 345/150 |
| 5,742,698 A | 4/1998 | Minami et al. | 382/100 |
| 5,786,803 A | 7/1998 | Hernandez et al. | 345/153 |
| 5,792,147 A | 8/1998 | Evans et al. | 606/130 |
| 5,793,340 A | 8/1998 | Morita et al. | 345/7 |
| 5,803,570 A | 9/1998 | Chen et al. | 353/122 |
| 6,115,022 A * | 9/2000 | Mayer, III et al. | 345/112 |
| 6,219,099 B1 * | 4/2001 | Johnson et al. | 348/383 |
| 6,292,171 B1 * | 9/2001 | Fu et al. | 345/156 |
| 6,331,848 B1 * | 12/2001 | Stove et al. | 345/156 |
| 6,346,933 B1 * | 2/2002 | Lin | 345/157 |
| 6,483,555 B1 * | 11/2002 | Thielemans et al. | 348/745 |

\* cited by examiner

METHOD AND APPARATUS FOR CALIBRATING PROJECTOR-CAMERA SYSTEM

CROSS-REFERENCE TO RELATED APPLICATION

This application claims the benefit from U.S. Provisional application Ser. No. 60/172,037 filed Dec. 23, 1999.

BACKGROUND OF THE INVENTION

1. Field of the Invention

The present invention relates generally to calibration systems and, in particular, to the automatic calibration of a projector-camera system.

2. Description of the Prior Art

Many computer vision applications involve transformations between an observed point in the scene and the corresponding point in the camera image. The parameters for this projective transformation are typically derived by establishing correspondences between a small set of points on a known target and their respective images. In a camera-projection system, pixels in the computer display frame are projected onto a flat surface and then observed by a camera. This involves a composition of two transforms: one from the projector to the screen and a second from the screen to the camera.

A known calibration pattern is projected onto a possibly unknown flat surface by a projector with a possibly unknown location, orientation and focal length. An image of this pattern is captured by a camera mounted at a possibly unknown location and orientation and with a possibly unknown focal length. It is necessary then to recover the mapping between a given point in the source (pre-projection) image and its corresponding point in the camera image.

Recovering the parameters of the mapping in the prior art systems requires knowledge of the projector and camera setup. Typically, passive scenes are tradditionally studied in computer vision applications for a projector-camera system. In addition, complete physical models must be derived to create a composition of non-linear distortions.

It is, therefore, an object of the present invention to allow the recovery of the parameters of the mapping without knowledge of the projector and camera setup. It is another object of the present invention to allow the projector-camera system to project known calibration patterns into the scene, unlike the passive scenes traditionally studied in computer vision. It is a further object of the present invention to be modeled as a single projective transform, not requiring the derivation of a complete physical model. It is well known that a projective transform can be completely specified by eight parameters, so it is still a further object of the present invention to automatically recover these parameters.

SUMMARY OF THE INVENTION

In order to overcome the problems with prior art systems, we have developed a method which includes arbitrarily placing a camera and projector in the scene, such that their fields of view intersect a (planar) region on the screen; projecting one or more known calibration patterns on the screen; capturing the images of the calibration pattern(s) by a digital camera; identifying the locations of the features in the calibration pattern(s) in the camera image(s); and, given the locations of a small set of corresponding features in both source and camera frames, utilizing the techniques of linear algebra to obtain the parameters for the mapping. At least four feature points (in one or more patterns) must be visible in the camera image. If more features are available, then the mapping that best fits the data (in a least-squares sense) is found.

We have also developed an apparatus that is capable of performing the above-described method.

DETAILED DESCRIPTION OF THE PREFERRED EMBODIMENT

The present invention is a method to recover the mapping between a given point in a source (pre-projection) image and its corresponding point in a camera image. According to the present invention, there is provided a method and apparatus for calibrating a projection-camera system.

Figure 1:
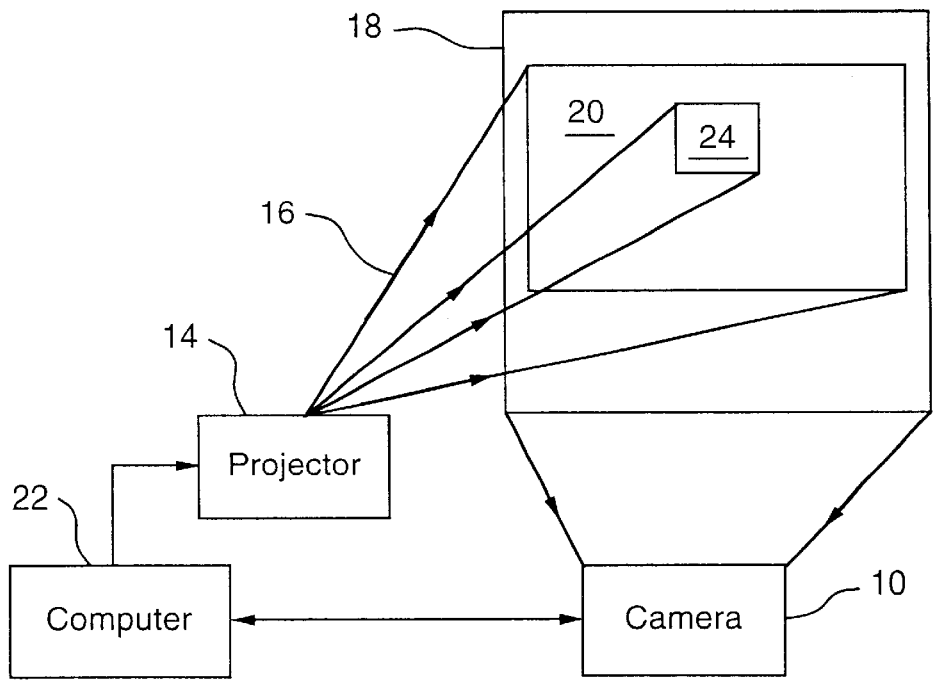
FIG. 1 is a block diagram of one embodiment of an apparatus according to the present invention.

Referring to FIG. 1, the apparatus includes a camera 10 with a camera image frame and a camera field of view 12, a projector 14 with a source image frame and a projector field of projection 16, a projection surface 18 with a projection image frame 20, and a computer 22 for performing a feature extraction algorithm and for mapping parameters utilizing the techniques of linear algebra. The projector 14 is adapted to project a calibration pattern 24 onto the projection surface 18.

Figure 2:
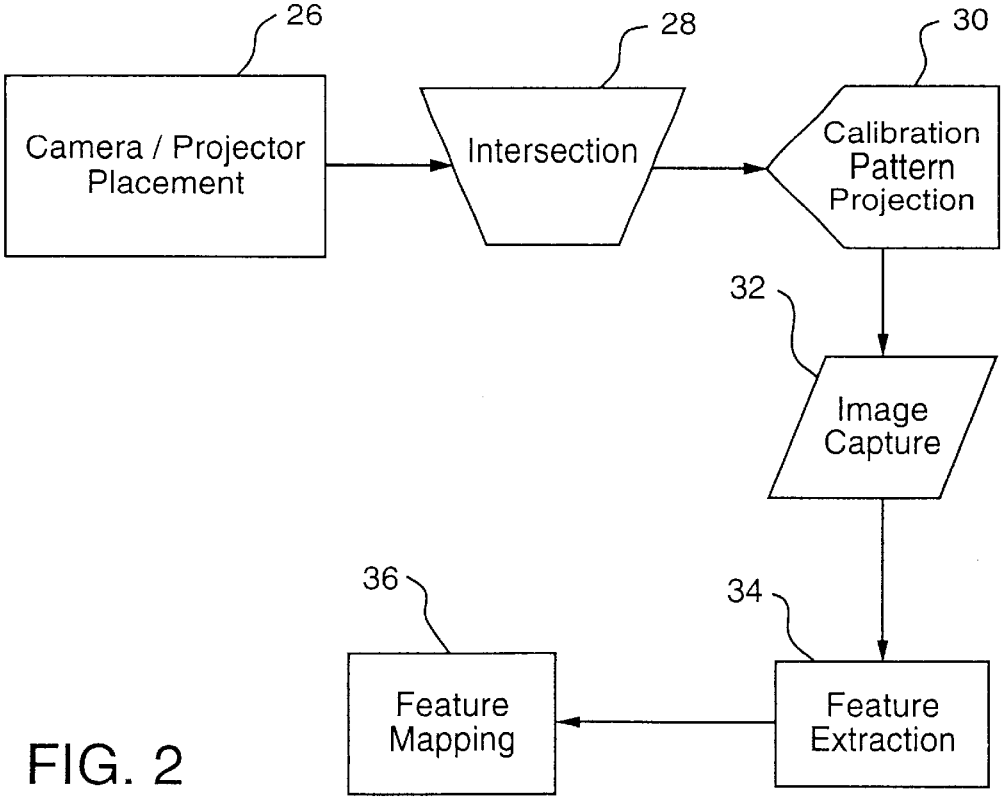
FIG. 2 is a flow diagram illustrating the general method according to the present invention.

As shown in FIG. 2, automatically calibrating a projector camera system is achieved through the steps of: arbitrarily placing the camera 10 and the projector 14 (camera/projector placement step 26); intersecting the field of view 12 of the camera 10 with the field of projection 16 of the projector 14 on the projection surface 18 (intersection step 28); projecting an image of the calibration pattern 24, with a plurality of calibration pattern feature points, onto the projection surface 18 (calibration pattern projection step 30); capturing the image of the calibration pattern 24 by the camera 10 (image capture step 32); identifying locations of calibration pattern feature points in the camera image frame of the captured image using a feature extraction algorithm (feature extraction step 34); and obtaining parameters for mapping, utilizing the techniques of linear algebra, given the location of a calibration pattern feature point in the source image frame and a corresponding location of the calibration pattern feature point in the camera image frame (feature mapping step 36).

To clarify the following discussion, the following frames of reference are defined. The "source image frame" is the coordinates in the internal representation of the screen (typically pixels). The "projected image frame" 20 is the coordinates on the projection surface 18. Unless the orientation of the projector 14, such as an LCD projector or CRT monitor, is perpendicular to the projection surface 18, the image will be non-linearly distorted. One cannot make direct observations in this frame. Finally, the "camera image frame" is the coordinates in the image captured by the camera 10 (in which the projected image frame 20 is a sub-region). Unless the orientation of the camera 10 is perpendicular to the projection surface 18, the image of the screen will be non-linearly distorted.

The current mathematical model assumes that: (1) the camera 10 and projector 14 optics can be modeled by perspective transformations (i.e., a pinhole optical model); and (2) the projection surface 18 (screen) is planar. In practice, the method is robust to deviations from these assumptions.

In a preferred embodiment of the apparatus of the present invention, the computer 22 (laptop computer) was connected-to the LCD projector 14 and images were acquired from a low-resolution digital camera 10 connected to the parallel port of the computer 22. Several different projector 14 and camera 10 models may be employed.

A known calibration pattern can be projected onto a possibly unknown flat surface by a projector with a possibly unknown location, orientation and focal length. An image of this pattern is captured by a camera mounted at a possibly unknown location, orientation and with possibly unknown focal length.

As shown in FIG. 2, the first step 26 is arbitrarily placing the camera and projector on the scene. In the next step 28, the camera fields of view 12 must intersect the projector field of projection 16 at a (planar) region on the projection surface 18. At this point, step 30 includes projecting one or more calibration patterns 24, each having calibration pattern feature points, into the projected image frame 20. No special calibration patterns 24 are required as long as four feature points projected on the projection surface 18 are visible in the set of camera images and the correspondences between a given feature point in a source image and a feature point in a camera image can be determined. In accordance with the present invention, several calibration patterns were demonstrated:

1. A set of N images, each consisting of a single bright spot on a dark background. A color camera was not required.
2. A black background with four colored dots (red, green, blue and white) near each of the four corners of the source image frame. The dots were designed to facilitate color-based feature extraction. A color camera was required.
3. A set of N images, each consisting of a white rectangle on a black background (each image depicted a different-sized rectangle). The corners of each rectangle were used as features (for a total of 4N features). By computing intersections of lines, sub-pixel resolution in feature location was achieved. A color camera was not required.

Many other patterns 24 could be devised using combinations of grids, lines, polygons and color or monochromatic dots. It should be noted that high contrast is required between points on the calibration pattern and the background. Additionally, calibration patterns 24 may be derived to maximize accuracy based on statistical error models of the projection and feature extraction process. For instance, placing four features in a small region on the projected image frame 20 is inferior to placing them maximally apart. Furthermore, the calibration pattern 24 need not employ visible light. Any radiation that can be reliably projected and also detected by the camera 10 (e.g., infrared) is viable. It is also envisioned that the system continually recalibrate itself at periodic intervals, correcting for any system changes. Alternatively, the calibration pattern 24 can be determined adaptively during the calibration process to improve calibration quality. After projection, step 32 requires the camera to capture the image of the calibration pattern 24.

The next step 34, identifying locations of calibration pattern 24 feature points in the camera image frame of the captured image using a feature extraction algorithm, should be tuned to the specific calibration pattern 24. For the patterns described above, the following respective algorithms were employed:

1. The grayscale image was thresholded by intensity value to create a binary image. The centroid of the bright pixels was assumed to be the location of that particular feature, providing sub-pixel resolution.
2. The three color bands (red, green, blue) in the image from the camera were separately thresholded. Pixels that responded strongly in only one band were associated with the red, green or blue dot, respectively. The pixels that responded strongly in all three bands were associated with the white dot. As above, the centroids of each dot were computed to obtain the location of the given feature.
3. Each of the calibration images was processed independently. First, the grayscale image was converted into a binary image by thresholding. A connected components algorithm was used to identify the largest region of bright pixels in the screen (assumed to be the area in the image corresponding to the white square in the calibration image). The edges of this component were extracted and the intersections between adjacent edges computed to give the locations of the corners (again to sub-pixel accuracy).

The location of the features could optionally be adjusted by the user using an interactive tool.

Finally, in step 36, the parameters for mapping are obtained. Given the locations of a small set of corresponding features in both source and camera frames, the techniques of linear algebra are used to obtain the parameters for the mapping. Let the location of the feature, i, in the camera image frame be $(X_i, Y_1)$, and its corresponding location in the source image frame be $(x_i, y_i)$. Let:

$$A_i = \begin{pmatrix} X_i & Y_i & 1 & 0 & 0 & 0 & -X_i x_i & -Y_i x_i & -x_i \\ 0 & 0 & 0 & X_i & Y_i & 1 & -X_i y_i & -Y_i y_i & -y_i \end{pmatrix}$$

$$B = \sum_i A_i^T A_i$$

Let $\bar{p}=(p_1...p_9)$ be the parameters of the mapping, with the constraint that $\bar{p}$ is a unit vector ($|\bar{p}|=1$), resulting in eight degrees of freedom. Now, the $\bar{p}$ that best maps the points from the camera image frame to the source image frame is given by the eigenvector corresponding to the smallest eigenvalue of the matrix B.

Given the mapping $\bar{p}$ any given point $(X, Y)$ in the camera image frame is transformable to its corresponding point $(x,y)$ in the source image frame by the following equation:

$$(x, y) = \left( \frac{p_1 X + p_2 Y + p_3}{p_7 X + p_8 Y + p_9}, \frac{p_4 X + p_5 Y + p_6}{p_7 X + p_8 Y + p_9} \right)$$

Since the vector $\bar{p}$ has eight degrees of freedom, at least four point correspondences (where each point provides two constraints) are required.

The mapping ignores physical parameters such as position, orientation and focal length (for both camera 10 and projector 14). While there can be multiple physical configurations that lead to the mapping, the mapping is completely specified by the feature point correspondences.

To obtain the inverse mapping from the source image frame to the camera image frame, the above formulation is utilized exchanging $(x_i, y_i)$ and $(X_i, Y_i)$ in all cases. Similarly, if the scene consists of multiple connected or disconnected planar patches (e.g., multi-piece projection screen or the inside of a geodesic dome), the present invention can easily be applied, provided that: (1) the calibration pattern(s) 24 project at least four feature points on each planar surface of interest; and (2) the system can identify which features are associated with each planar patch. Each mapping derived from the feature points in a given planar patch is derived independently and is valid for that planar surface. Additionally, different regions of the camera image or the display device may be independently calibrated. Further, the projection surface 18 may be planar or piece-wise planar.

The present invention method may also be performed by a user, allowing the refinement of the calibration procedure interactively. In order for the user to interact with the system, the calibration pattern 24 must be visible to the user.

In this manner, the present invention allows for the recovery of the parameters of mapping without knowledge of the projector 14 and camera 10 setup. Further, the present invention allows the projector-camera system to project known calibration patterns 24 into the scene. The derivation of a complete physical model is not required, as the present invention is modeled as a single projective transform. Overall, the present invention calibrates the projector-camera system by automatically recovering the necessary parameters.

The invention itself, both as to its construction and its method of operation, together with the additional objects and advantages thereof, will best be understood from the previous description of specific embodiments when read in connection with the accompanying drawings. Although the specific description of the herein disclosed invention has been described in detail above, it may be appreciated that those skilled in the art may make other modifications and changes in the invention disclosed above without departing from the spirit and scope thereof.

We claim:

1. A computer implemented method for automatically calibrating a system having a camera with a camera image frame, a projector with a source image frame and a projection surface with a projection image frame, comprising the steps of:

arbitrarily placing the camera and the projector;

intersecting a camera field of view of the camera with a projector field of projection of the projector on the projection surface;

projecting an image of a calibration pattern with a plurality of calibration pattern feature points onto the projection surface;

capturing the image of the calibration pattern by the camera;

identifying locations of calibration pattern feature points in the camera image frame of the captured image using a feature extraction algorithm; and obtaining parameters for mapping utilizing techniques of linear algebra, given a location of a calibration pattern feature point in the source image frame and a corresponding location of the calibration pattern feature point in the camera image frame such that the system is calibrated, wherein the location of the calibration pattern feature point, i, in the camera image frame is $(X_i, Y_i)$, the corresponding location of the calibration pattern feature point in the source image frame is $(x_i, y_i)$, $$A_i = \begin{pmatrix} X_i & Y_i & 1 & 0 & 0 & 0 & -X_i x_i & -Y_i x_i & -x_i \\ 0 & 0 & 0 & X_i & Y_i & 1 & -X_i y_i & -Y_i y_i & -y_i \end{pmatrix}$$

$$B = \sum_i A_i^T A_i$$

the parameters of the mapping are represented by $\bar{p}=(p_1 \ldots p_9)$, $\bar{p}$ is a unit vector resulting in eight degrees of freedom, the $\bar{p}$ that best maps the calibration pattern feature point from the camera image frame to the source image frame is given by the eigenvector corresponding to the smallest eigenvalue of the matrix B, and given the mapping $\bar{p}$, any given point (X, Y) in the camera image frame is transformable to its corresponding point (x,y) in the source image frame by the following equation, $$(x, y) = \left( \frac{p_1 X + p_2 Y + p_3}{p_7 X + p_8 Y + p_9}, \frac{p_4 X + p_5 Y + p_6}{p_7 X + p_8 Y + p_9} \right).$$

2. The method of claim 1 wherein the projection surface is planar.

3. The method of claim 1 wherein a plurality of images of calibration patterns is projected onto the projection surface.

4. The method of claim 1 wherein the calibration pattern comprises a set of images, with each image formed as a single pixel on a contrasting background.

5. The method of claim 1 wherein the feature extraction algorithm includes the step of:

thresholding by intensity the pixel to create a binary image such that a centroid of the pixel is the location of a corresponding calibration pattern feature point.

6. The method of claim 1 wherein the calibration pattern includes four differently colored spots on a black background, with each colored spot located near a corner of the source image frame.

7. The method of claim 1 wherein the calibration pattern includes a set of images, with each image formed as a differently sized white rectangle on a black background.

8. The method of claim 7 further including the step of:

computing intersections of lines of corners of each differently sized white rectangle.

9. The method of claim 1 wherein the feature extraction algorithm includes the steps of:

thresholding by intensity the pixel to create a binary image;

utilizing a connected components algorithm to identify the largest region of bright pixels in the image corresponding to the differently sized white rectangle in the calibration pattern;

extracting the edges of the largest region; and computing the intersections between adjacent edges, yielding the locations of the corners to sub-pixel accuracy.

10. The method of claim 1 wherein the location of the calibration pattern feature points is manually adjustable by a user.

11. The method of claim 1 wherein inverse mapping from the source image frame to the camera image frame exchanges $(x_i,y_i)$ and $(X_i, Y_i)$ in all cases.

12. The method of claim 1 wherein the projection surface includes a plurality of planar patches, a calibration pattern having at least four calibration pattern feature points is projected onto each of the planar patches, and parameters for mapping each planar patch is independently derived.

13. The method of claim 1 wherein the parameters for mapping are restricted between calibration pattern feature points in the camera image frame and the corresponding calibration pattern feature points in the projection image frame.

14. An automatic calibration system comprising:
a camera with a camera image frame and a camera field of view;
a projector with a source image frame and a projector field of projection;
a projection surface with a projection image frame;
a means for performing a feature extraction algorithm; and
a means for mapping parameters utilizing techniques of linear algebra,
wherein the camera and the projector are arbitrarily placed, a camera field of view of the camera intersects a projector field of projection of the projector on the projection surface, the projector projects an image of a calibration pattern with a plurality of calibration pattern feature points onto the projection surface, the camera captures the image of the calibration pattern, the locations of calibration pattern feature points in the camera image frame of the captured image are identified using the feature extraction algorithm, and the parameters for mapping are obtained, given a location of a calibration pattern feature point in the source image frame and a corresponding location of the calibration pattern feature point in the camera image frame;
wherein the location of the calibration pattern feature point, i, in the camera image frame is $(X_i, Y_i)$, the corresponding location of the calibration pattern feature point in the source image frame is $(x_i, y_i)$, $$A_i = \begin{pmatrix} X_i & Y_i & 1 & 0 & 0 & 0 & -X_i x_i & -Y_i x_i & -x_i \\ 0 & 0 & 0 & X_i & Y_i & 1 & -X_i y_i & -Y_i y_i & -y_i \end{pmatrix}$$

$$B = \sum_i A_i^T A_i$$

the parameters of the mapping are represented by $\bar{p}=(p_1 \ldots p_9)$, $\bar{p}$ is a unit vector resulting in eight degrees of freedom, the $\bar{p}$ that best maps the calibration pattern feature point from the camera image frame to the source image frame is given by the eigenvector corresponding to the smallest eigenvalue of the matrix B, and given the mapping $\bar{p}$, any given point (X, Y) in the camera image frame is transformable to its corresponding point (x,y) in the source image frame by the following equation, $$(x, y) = \left( \frac{p_1 X + p_2 Y + p_3}{p_7 X + p_8 Y + p_9}, \frac{p_4 X + p_5 Y + p_6}{p_7 X + p_8 Y + p_9} \right).$$

15. The automatic calibration system of claim 14 wherein at least four calibration pattern feature points are identified in the camera image frame of the captured image.

16. The automatic calibration system of claim 14 wherein the projection surface is planar.

17. The automatic calibration system of claim 14 wherein the projection surface is piece-wise planar.

18. The automatic calibration system of claim 14 wherein the camera is a digital camera.

19. The automatic calibration system of claim 14 wherein the projector is an LCD projector.

20. The automatic calibration system of claim 14 further comprising a computer in communication with the projector, wherein the camera is in communication with the computer.

21. The automatic calibration system of claim 14 wherein a plurality of images of calibration patterns is projected onto the projection surface.

22. The automatic calibration system of claim 14 wherein the calibration pattern comprises a set of images, with each image formed as a single pixel on a contrasting background.

23. The automatic calibration system of claim 14 wherein the feature extraction algorithm creates a binary image by thresholding by intensity a pixel such that a centroid of the pixel is the location of a corresponding calibration pattern feature point.

24. The automatic calibration system of claim 14 wherein the calibration pattern includes four differently colored spots on a black background, with each colored spot located near a corner of the source image frame.

25. The automatic calibration system of claim 14 wherein the calibration pattern includes a set of images, with each image formed as a differently sized white rectangle on a black background.

26. The automatic calibration system of claim 25 wherein intersections of lines of corners of each differently sized white rectangle are computed.

27. The automatic calibration system of claim 14 wherein the feature extraction algorithm is performed by thresholding by intensity the pixel to create a binary image, utilizing a connected components algorithm to identify the largest region of bright pixels in the image corresponding to the differently sized white rectangle in the calibration pattern, extracting the edges of the largest region, and computing the intersections between adjacent edges, yielding the locations of the corners to sub-pixel accuracy.

28. The automatic calibration system of claim 14 wherein the calibration pattern is selected from the group consisting of grids, lines, polygons and dots.

29. The automatic calibration system of claim 14 wherein the accuracy of the calibration pattern is maximized using statistical error models.

30. The automatic calibration system of claim 14 wherein the calibration pattern feature points are in a maximally spaced apart relationship.

31. The automatic calibration system of claim 14 wherein the projected calibration pattern is non-visible light.

32. The automatic calibration system of claim 14 wherein the non-visible light is infrared light.

33. The automatic calibration system of claim 14 wherein the location of the calibration pattern feature points is manually adjustable by a user.

34. The automatic calibration system of claim 14 wherein inverse mapping from the source image frame to the camera image frame exchanges $(x_i, y_i)$ and $(X_i, Y_i)$ in all cases.

35. The automatic calibration system of claim 14 wherein the projection surface includes a plurality of planar patches, a calibration pattern having at least four calibration pattern feature points is projected onto each of the planar patches, and the parameters for mapping each planar patch is independently derived.

36. The automatic calibration system of claim 14 wherein the captured image emanates from a computer CRT monitor.

37. The automatic calibration system of claim 14 wherein the captured image emanates from an LCD display device.

38. The automatic calibration system of claim 14 wherein the system periodically repeats the steps of identifying the locations of calibration pattern feature points in the camera image frame of the captured image using a feature extraction algorithm, and obtaining parameters for mapping utilizing the techniques of linear algebra, given a location of a calibration pattern feature point in the source image frame and a corresponding location of the calibration pattern feature point in the camera image frame.

39. The automatic calibration system of claim 14 wherein the parameters for mapping are restricted between calibration pattern feature points in the camera image frame and the corresponding calibration pattern feature points in the projection image frame.

40. The automatic calibration system of claim 14 wherein different regions of the camera image frame are independently calibrated.

41. The automatic calibration system of claim 14 wherein different regions of the source image frame are independently calibrated.

42. The automatic calibration system of claim 14 wherein the calibration pattern is visible to a user.

43. The automatic calibration system of claim 14 wherein the calibration pattern is detectable by the camera.

44. The automatic calibration system of claim 14 wherein the type of calibration pattern utilized is determined adaptively during the calibration process.

45. The automatic calibration system of claim 14 wherein the means for performing the feature extraction algorithm is a computer.

46. The automatic calibration system of claim 14 wherein the means for mapping the parameters utilizing techniques of linear algebra is a computer.

* * * * *